United States Patent

[11] 3,614,337

[72] Inventor Shigeo Minami
 Ashiya-shi, Japan
[21] Appl. No. 763,334
[22] Filed Sept. 27, 1968
[45] Patented Oct. 19, 1971
[73] Assignee Hitachi, Ltd.
 Tokyo, Japan
[32] Priority Sept. 29, 1967
[33] Japan
[31] 42/62950

[54] ANALOG DATA ACCUMULATOR PROVIDING IMPROVED SIGNAL-TO-NOISE RATIO
 9 Claims, 7 Drawing Figs.
[52] U.S. Cl.......................................179/100.2 K,
 340/174.1 B
[51] Int. Cl.......................................G11b 5/02,
 G11b 5/86
[50] Field of Search........................... 179/100.2
 K, 100.2 S, 100.2 MI; 340/174.1 B

[56] References Cited
UNITED STATES PATENTS
3,480,932 11/1969 Brandstadter............... 340/174.1
3,378,825 4/1968 Offner............................ 179/100.2

Primary Examiner—Bernard Konick
Assistant Examiner—Robert S. Tupper
Attorney—Craig, Antonelli, Stewart & Hill ABSTRACT: An analog data accumulator which stores the first analog data from an analog data source in a tape recorder through an analog adder, reproduces the stored analog data to feed it to the adder reproduces the stored analog data to feed it to the adder which adds the reproduced first analog data and the second analog data from the analog data source, and stores the added data in the tape, recorder, and repeats these operations a plurality of times, thereby improving the signal to noise ratio.

ANALOG DATA ACCUMULATOR PROVIDING IMPROVED SIGNAL-TO-NOISE RATIO

The present invention relates to analog data accumulators, and more particularly to analog data accumulators which repeatedly add analog data so as to improve the signal to noise ratio thereof.

It is important in certain technical fields to attempt to obtain exactly the time variation in signals buried in noise. There are many examples among such signals which can be reproduced repeatedly. Examples of signals which are functions of time are output signals of electrical circuitry responsive to known input pulses, output signals of living bodies responsive to stimuli, etc. Signals obtained by scanning-type measurements employed in so-called autorecording analyzing instruments such as, for example, spectrophotometers, mass spectrometers, gyromagnetic resonance apparatuses, etc. or by reading spatially distributed optical or electronic images are functions of physical quantities other than time, for example position, wavelength or electromagnetic wave, intensity of magnetic field, etc. However, even these signals are treated as functions of time in detecting systems.

When the measurement of signals can be carried out repeatedly as stated above, even in a state where the signals are indistinguishable because of the presence of high level noises, the signals can by degrees be isolated from the noises by accumulating the results of repeated measurements because the signal-to-noise ratio is improved in proportion to the square root of the number of times of accumulation. This method is known as a method of improving signal-to-noise ratio by data accumulation. In most cases analog data is accumulated as a digital quantity by means of a combination of digital storage means and adder means after the analog data has been converted into the digital quantity. This method can provide high accuracy results because it is a digital method. On the other hand, however, the apparatus itself is often complicated and expensive when there are many data points involved.

Recently, high accuracy tape recorders have been utilized in many fields of technology for storing analog data, but there is no yet instance of utilizing a tape recorder in combination with an adder for the purpose of improving the signal to noise ratio.

Therefore, an object of the present invention is to provide a novel analog data accumulating apparatus which has improved signal to noise ratio by accumulating analog data very simply by employing an analog adder in an adding part and a tape recorder as a storing part of an analog data system.

Another object of the present invention is to provide such an apparatus as mentioned above capable of avoiding undesirable influences due to the expansion and contraction of and irregularity of movement of a tape, irregularity of the rotation of a capstan of the tape recorder, etc.

A further object of the present invention is to provide such an apparatus as mentioned above in which the tape recorder has a channel for analog data and another channel for synchronizing signals, which other channel can be employed as a part of the circuitry for obviating the undesirable influences of expansion and contraction of and irregularity of movement of the tape, irregularity of the rotation of the capstan, etc.

Still another object of the present invention is to provide such an apparatus as mentioned above capable of erasing analog data accumulated N times and stored in the tape of the tape recorder after it has been reproduced, and immediately storing analog data accumulated N+1 times in the erased portion.

The present invention is basically characterized by an analog data accumulating apparatus comprising an analog adder having two input terminals, a source for generating analog data, means for feeding said analog data to one of said two input terminals, a tape recorder having a recording tape and a head for recording analog data derived from said analog adder on said recording tape and another head for reproducing the analog data stored in said tape, means for feeding the analog data reproduced by said other head to the other of said two input terminals, and means for synchronizing said analog data fed to both said input terminals in adding in said adder.

Other objects, features and advantages of the present invention will become more apparent from the following description of preferred embodiments of the invention made with reference to the accompanying drawings, in which FIG. 1 is a block diagram of an embodiment of the analog data accumulator according to the invention;

FIGS. 4a to 4d are diagrams illustrating results of data treatment carried out by an analog data accumulator according to the invention.

Figure 1:
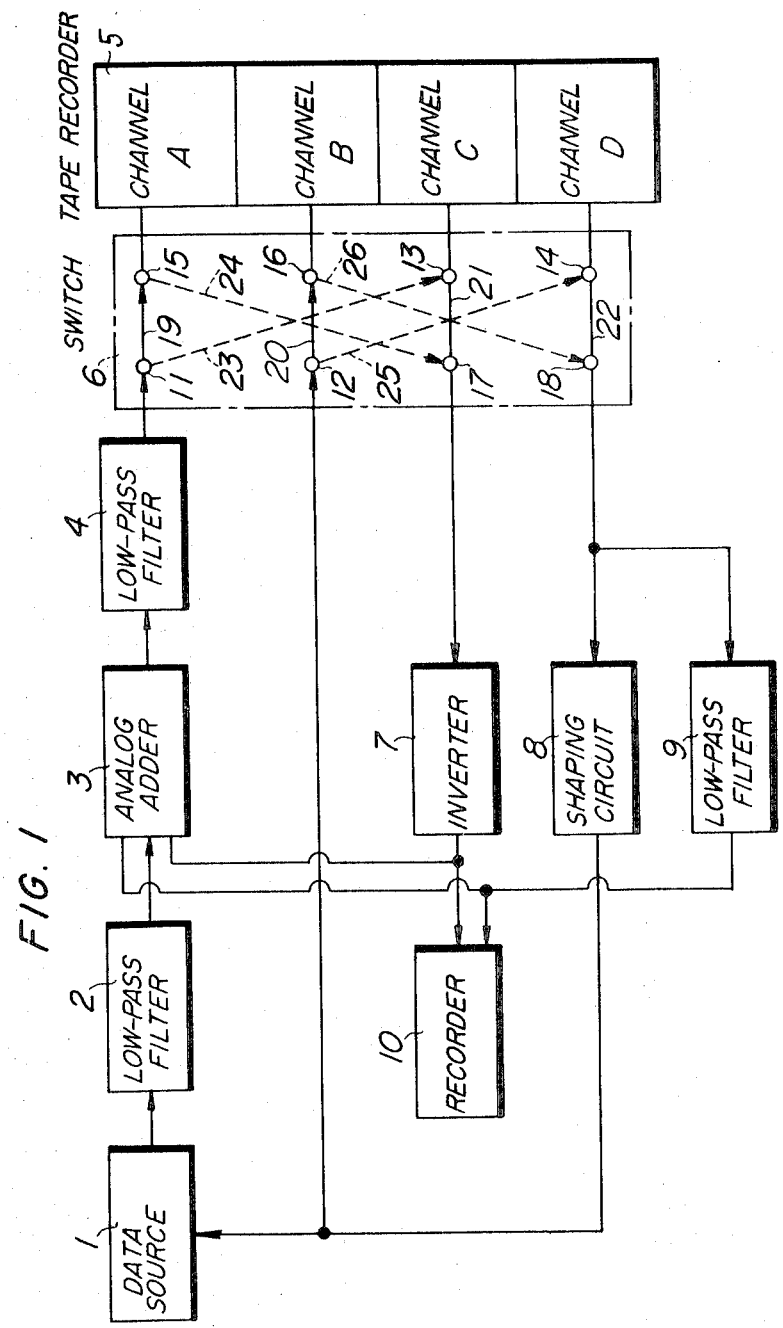

Referring to FIG. 1, an analog data accumulator comprises an analog data source 1, a low-pass filter 2, an analog data adder 3, and a low-pass filter 4, which are serially connected in this order. The analog data source 1 may be any one of what can repeatedly provide analog data, for example a mass spectrometer, spectrophotometer, gyromagnetic resonance apparatus, or electroencephalograph. The accumulator of FIG. 1 further comprises a tape recorder 5 having four channels A, B, C and D, and associated respective recording and reproducing heads (not shown) a changeover switch 6, an inverter 7, a pulse shaping circuit 8, a low-pass filter 9, and a chart recorder 10. The output of the inverter 7 is connected to the inputs to the analog adder 7 and chart recorder 10. The changeover switch 6 is provided with eight terminals 11 to 18. The switch 6 effects switching between the state indicated by solid arrows 19, 20, 21 and 22 and the state indicated by dotted arrows 23, 24 25 and 26, and may be a conventional one. The four terminals 11, 12, 13 and 14 are connected with the output of the low-pass filter 4, the output of the shaping circuit 8 which is also connected to the analog data source 1, the channel C and the channel D, respectively, and the remaining four terminals 15, 16, 17 and 18 are connected with the channel A, the channel B, the input of the inverter 7, and the input of the shaping circuit 8, respectively. The input to the low-pass filter 9 is connected with the input to the shaping circuit 8, and the output of the low-pass filter 9 is connected with the inputs to the chart recorder 10 and the adder 3. Although a detailed illustration is omitted for the sake of simplicity, the tape recorder 5 is such that the channels A and B are utilized as storage channels and at the same time the channels C and D are utilized as reproduction channels in the state of the switch 6 indicated by the solid arrows 19, 20, 21 and 22, and conversely, in the state of the switch 6 indicated by the dotted arrows 23, 24, 25 and 26, the channels C and D are utilized as storage channels and the channels A and B are utilized as reproduction channels.

Figure 3:
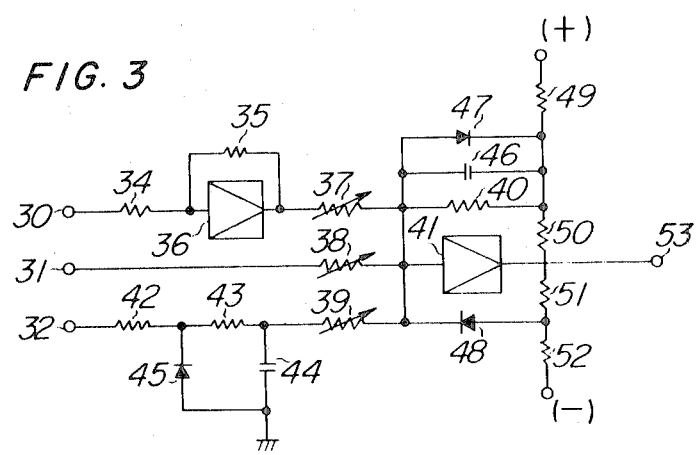
FIG. 3 is a circuit diagram employed in the embodiments of FIGS. 1 and 2.

FIG. 3 is a detailed circuit diagram of the analog data accumulator of FIG. 1. The circuit of FIG. 3 comprises three input terminals 30, 31 and 32, an inverter consisting of resistors 34 and 35 and an amplifier 36, an analog adder constituted by resistors 37 to 40 and an amplifier 41, a first low-pass filter constituted by resistors 42 and 43, a capacitor 44, and a diode 45, a second low-pass filter constituted by a capacitor 46 only, a clipping circuit constructed out of diodes 47 and 48 and resistors 49 and 52, and an output terminal 53. The inverter, analog adder, first low-pass filter, and second low-pass filter correspond to the inverter 7, analog adder 3, low-pass filter 9, and low-pass filter 4, respectively, of FIG. 1. The three input terminals 30, 31 and 32 represent the input side of the inverter 7, the output side of the low-pass filter 2, and the input side of the low-pass filter 9, respectively, in FIG. 1, and the output terminal 53 corresponds to the terminal 11 of the changeover switch 6 in FIG. 1.

Incidentally, the low-pass filter 2 and the shaping circuit 8 in FIG. 1 are not shown in FIG. 3 for the sake of simplicity because they can be conventional ones.

The operation of the apparatus of FIG. 1 will now be described. The first analog data from the analog data source 1 is fed to the low-pass filter 2 through which only the lower component (10 Hz. for example) of the analog data is passed and fed to the low-pass filter 4 through the analog adder 3, at which time if the changeover switch 6 is in the state indicated by the solid arrows 19 to 22, low frequency analog data which is an output of the low-pass filter 4 is stored in the channel A in the tape recorder 5. It is assumed, however, that a pulse signal for synchronization i stored in the channel B at the same time as the initiation of the operation of the analog data source 1.

Upon the completion of the storage of the first analog data in the channel A, the changeover switch 6 is switched to the state indicated by the dotted arrows 23 to 26 by a completion signal. (An illustration of this operation has been omitted for the sake of simplicity). In this state the synchronizing signal stored in the channel B is reproduced and shaped by the shaping circuit 8. The shaped synchronizing signal triggers the analog data source 1 to derive therefrom the second analog data. The second analog data is fed to the adder 3 as described above referring to the first analog data. Of course, the synchronizing pulse signal which is an output of the wave shaping circuit 8 is not only fed to the analog data source 1, but also stored in the channel D as an analog data generating signal for deriving the third analog data from the analog data source 1. On the other hand, the first analog data stored in the channel A is reproduced, and then, after being inverted in polarity by the inverter 7, is fed to the analog adder 3. Consequently, the first analog data and the second analog data are synchronously added in the adder 3. The added analog data is stored in the channel C after passing through the low-pass filter 4. After the completion of the storing of the added analog data the changeover switch 6 is switched to the state indicated by the solid arrows 19 to 22 by a completion signal. At this time, the synchronizing pulse signal stored in the channel D is reproduced and, in a manner as described above, delivered to the wave shaping circuit 8 the output of which triggers the analog data source 1 to deliver the third analog data to the adder 3 through the low-pass filter 2. Of course, the output of the wave shaping circuit 8 is stored in the channel B as an analog data generating signal for triggering the analog data source 1 to deliver the fourth analog data. On the other hand, the analog data obtained by adding up to the second data and stored in the channel C are reproduced and fed to the adder 3 after they are inverted by the inverter 7. Consequently, the data added up to the second data and the third data are added at the adder 3 and stored in the channel A through the low-pass filter 4.

By repeating the above-mentioned operation individual analog data provided by the analog data source 1 are successively accumulated, and finally the accumulated data is recorded in the chart recorder 10. The signal component of the accumulated data recorded in the chart recorder 10 is N times the signal components of individual data (N=the number of times of accumulation), and the noise component thereof becomes $\sqrt{N}$ times that of the individual data. Consequently, the gain of the signal to noise ratio of the accumulated data is proportional to $\sqrt{N}$. Thus, the signal component of the accumulated data is sufficiently isolated from the noise component.

Noises resulted from the expansion and contraction of and irregularity of movement of a tape, the irregularity of the rotation of a capstan, etc., give rise to errors in the results of accumulation processes of analog data because most of such noises contain low frequency noises lower than about 10 Hz. The system of FIG. 1 (including FIG. 3) solves this problem by utilizing the channels B and D for synchronization without being provided with an additional channel for compensation. That is, noises are detected together with the synchronizing signals from the channel D when the switch 6 is in the state indicated by the solid arrows and from the channel B when the switch 6 is in the state indicated by the dotted arrows, and fed through the low-pass filter 9 to the adder 3 where the noises are subtracted from analog data each time of accumulation to eliminate noise components.

In fact the tape of the tape recorder 5 is rewound each time of operation, i.e. each time of switching the changeover switch 6. As the tape, one which is necessary to be erased stored signals or in which stored signals vanish spontaneously may be employed.

Figure 2:
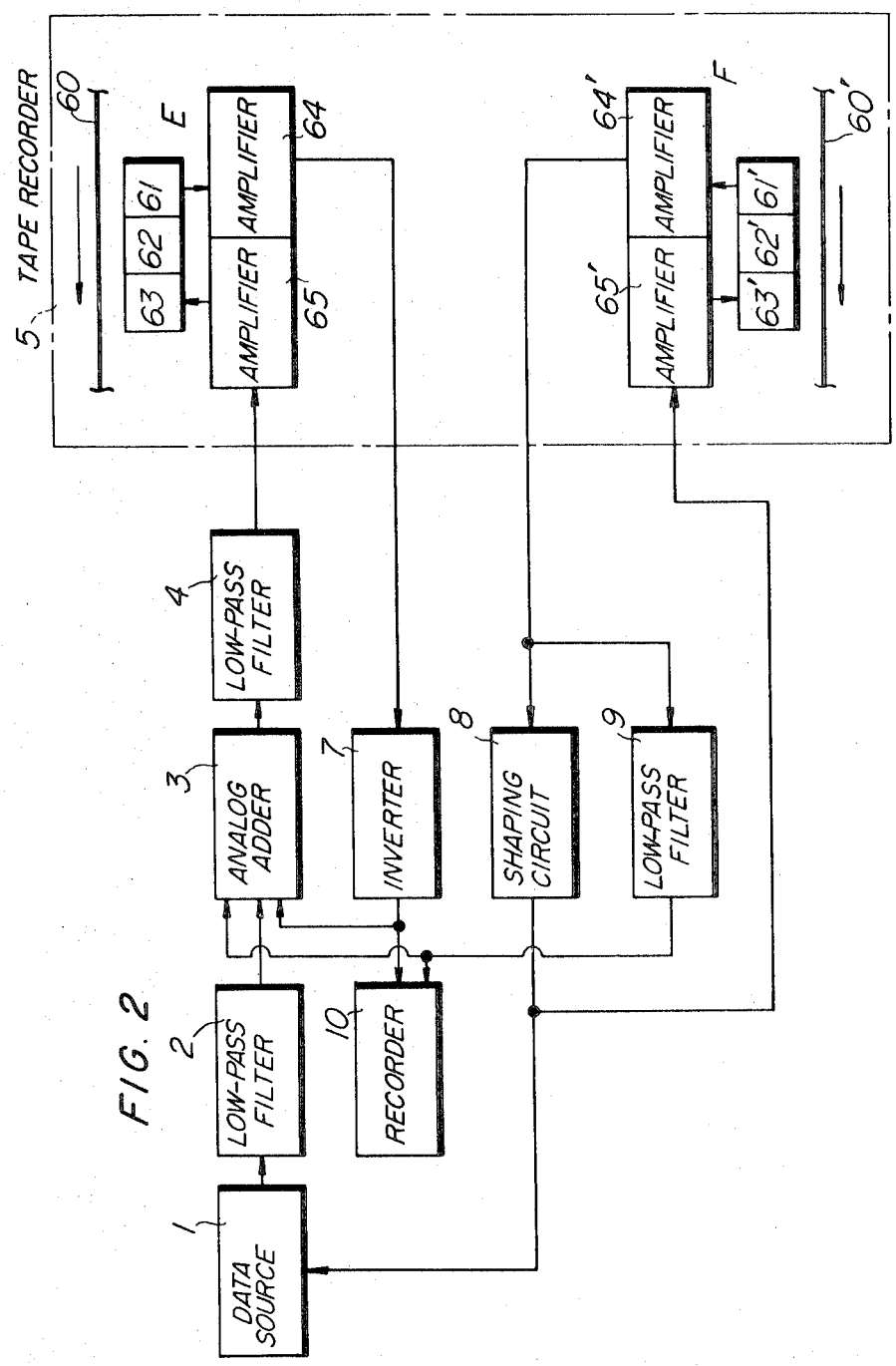
FIG. 2 is a block diagram of another embodiment of the analog data accumulator according to the invention.

FIG. 2 shows another data accumulating apparatus. The system of FIG. 2 is different from that of FIG. 1 in that while the system of FIG. 1 employed as the tape recorder 5 one having four channels in which each time of operation the channels A, B or C, D were alternately employed as storing channels or reproducing channels, the system of FIG. 2 employs as the tape recorder 5 one having two channels in which one of the two channels is employed for reproducing, wearing and storing analog data, and the other of the two channels is employed for reproducing, erasing and storing signals. The tape recorder 5 in FIG. 2 has a channel E for analog data and a channel F for synchronizing signals, which channels comprise recording tapes 60 and 60', reproducing heads 61 and 61', erasing heads 62 and 62', recording heads 63 and 63', amplifiers for reproducing head 64 and 64', and amplifiers for recording head 65 and 65', respectively. The reproducing heads 61 and 61', the erasing heads 62 and 62', and the recording heads 63 and 63' are arranged in this order in the advancing direction of the tape 60 and 60', respectively. The inputs of the amplifiers 65 and 65' are connected with the outputs of the low-pass filter 4 and the wave shaping circuit 8, respectively, and the outputs of the amplifiers 64 and 64' are connected with the inputs of the inverter 7 and the shaping circuit 8, respectively.

The operation of the system of FIG. 2, which is essentially the same as that of the system of FIG. 1, will now be described briefly.

The N-th analog data generated by the analog data source 1 is fed to the adder 3 through the low-pass filter 2. On the other hand, the analog data accumulated up to the (N−1)-th analog data and stored in the tape 60 are reproduced by the reproducing head 61, inverted by the inverter 7, and then fed to the adder 3 where the analog data accumulated up to the (N−1)-th analog data and the N-th analog data are added. The output of the adder 3, the analog data accumulated up to the N-th analog data, is stored in the tape 60 by means of the recording head 63 through the low-pass filter 4.

The generation of the N-th analog data by the analog data source 1 is initiated by a synchronizing pulse signal reproduced from the tape 60' by the reproducing head 61'. In more detail, the synchronizing pulse signal stored in the tape 60' by the recording head 63' when the (N−1)-th analog data was produced by the analog data source 1 is reproduced by the reproducing head 61' from the tape 60', shaped by the shaping circuit 8, triggers the analog data source 1 to initiate the generation of the N-th analog data.

The analog data accumulated up to the N-th analog data and stored in the tape 60 is reproduced by the reproducing head 61, and at the same time the synchronizing pulse signal stored in the tape 60' at the time of the generation of the N-th analog data at the analog data source 1 is reproduced by the reproducing head 61'. Then the accumulated analog data and the synchronizing signal stored in the tapes 60 and 60' are erased by the erasing heads 62 and 62', respectively. The synchronizing signal reproduced by the head 61' is fed to the wave shaping circuit 8, the output of which triggers the analog data source 1 to generate the (N+1)-th analog data. At this time a synchronizing signal for initiating the generation of the (N+2)-th analog data is of course stored in the tape 60' by the recording head 63'.

Subsequent operations are performed in all the same manner as the previous operations. Therefore, if the analog data obtained by accumulating an appropriate number of times are finally recorded in the chart recorder 10, the representation thereof is one which is improved in its signal to noise ratio as in the system of FIG. 1. Of course, since the output from the reproducing head 61' is fed to the adder 3 through the low pass filter 9 without passing through the wave shaping circuit 8 as in the system of FIG. 1, the noise component resulted from the expansion and contraction of and irregularity of the movement of the tape, the irregularity of movement of the capstan, etc., is eliminated.

As the tapes 60 and 60', wound-type ones or, as the case may be, endless-type ones may be employed.

Conventionally, heads of a tape recorder are arranged in the order of erasing, recording and reproducing heads relative to the advancing direction of a tape, whereas in the system of FIG. 2 they are arranged in the order of reproducing, erasing and recording heads. Consequently, after the reproducing operation the erasing operation is performed, and then the recording operation can immediately be performed.

Needless to say, the circuit of FIG. 3 can also be applied to the system of FIG. 2.

FIGS. 4a to 4d show results of the analog data accumulation process by the analog data accumulating system of FIG. 1 employing the circuit of FIG. 3. FIGS. 4a to 4d are cases of N (th number of times of accumulation) =1, 4, 20 and 100, respectively. It is noted from FIG. 4 that when N=1 (no addition) the signal and noise are hardly distinguishable, but as N becomes larger the due signal component and noise component can more clearly be isolated.

The results of FIGS. 4a to 4d were obtained under the following condition. A long life Scotch 3M488 tape (sandwich instrumentation tape) seldom causing drop out was used as the tape of the tape recorder. The characteristics of the tape were such that the input level was $\pm 1$ to $\pm 10$ volts, the output level was $\pm 1$ volt, the signal to noise ratio was 40db, the drift was $\pm 3$ percent (without compensation), and the input impedance was 5K $\Omega$. The gain of the amplifier 41 was 160 db.

It is to be noted that although the above description has been made with reference to a few preferred embodiments of the invention by way of example, the present invention is not limited to such embodiments and many other changes and modifications can be made within the scope of the invention.

What is claimed is:

1. An analog data accumulating device providing improved signal-to-noise ratio comprising: an analog data adder; an analog data source connected to the input of said analog data adder for repeatedly producing analog data to be supplied to said analog data adder; a tape recorder connected to the output of said analog data adder; first circuit means for recording the analog data derived from the output of said analog data adder in said tape recorder, including means for reproducing the recorded analog data and means for feeding the reproduced analog data back to the input of said analog data adder; second circuit means for repeatedly recording a synchronizing signal in said tape recorder, including means for repeatedly reproducing the recorded synchronizing signal and means for applying the reproduced synchronizing signal to said analog data source to perform successive accumulation of the analog data supplied from said analog data source to said analog data adder and the reproduced analog data in said analog data adder; and third circuit means for selecting low frequency components included in said reproduced synchronizing signal and for applying the selected low frequency components to the input of said analog data adder whereby said low frequency components are subtracted from the analog data to be accumulated in said analog data adder.

2. An analog data accumulating device for improving signal-to-noise ratio comprising: an analog data source for generating analog data; an analog data adder having first, second and third input terminals and an output terminal, said first input terminal being connected to said source to feed the analog data produced by said source to said adder through said first input terminal; a tape recorder including a recording tape having first and second tracks and first reproducing, erasing and recording heads associated with said first track, said first reproducing and recording heads being connected to said second input terminal and said output terminal, respectively, so that the analog data produced by said reproducing head is added in said adder to the analog data from said source; a synchronizing signal system having second reproducing erasing and recording heads associated with said second track, said second reproducing and recording heads being connected to each other and to said source so that a synchronizing signal is recorded in said second track by said second recording head, and the synchronizing signal stored in said second track is reproduced by said second reproducing head and fed to said source, whereby synchronized repetitive addition is carried out in said adder; and a low-pass filter having an output terminal connected to said third input terminal and an input terminal connected to said second reproducing head so as to subtract in said analog data adder low frequency components included in the reproduced synchronizing signal from the repeatedly added analog data.

3. An analog data accumulating device for improving signal-to-noise ratio according to claim 2, wherein said first reproducing, erasing and recording heads and said second reproducing, erasing and recording heads are closely arranged in the same order in the advancing direction of said recording tape, respectively.

4. An analog data accumulating device for improving signal-to-noise ratio according to claim 3, comprising a low-pass filter connected between said source and said first input terminal of said analog adder, and another low-pass filter connected between said output terminal of said analog adder and said first recording head.

5. An analog data accumulating device providing improved signal-to-noise ratio comprising: an analog data source for generating analog data; an analog data adder having first, second and third input terminals and an output terminal, said first input terminal being connected to said data source to receive analog data from said source; a tape recorder having first, second, third and fourth channels; switching means alternately switching between first and second modes for connecting said adder to said recorder, including first means for connecting in said first mode said output terminal to said first channel to store therein the analog data and said second input terminal to said second channel to supply said second input terminal with the analog data read out from said second channel and for changing in said second mode the connection of said output terminal from said first channel to said second channel to store therein the analog data and the connection of said second input terminal from said second channel to said first channel to supply said second input terminal with the analog data read out from said first channel, and second means synchronized with said first means for storing a synchronizing signal in said third channel in said first mode and in said fourth channel in said second mode and for transferring a synchronizing signal stored in said fourth channel to said source in said first mode and transferring a synchronizing signal stored in said third channel to said source in said second mode, whereby synchronized repetitive addition is performed in said adder; and a low-pass filter having an output terminal connected to said third input terminal and an input terminal connected to said third and fourth channels by way of said second means so as to subtract in said analog data adder low frequency components included in the reproduced synchronizing signal from said repeatedly added analog data.

6. An analog data accumulating device providing improved signal-to-noise ratio, according to claim 5 wherein said tape recorder includes a recording tape having first, second, third and fourth tracks associated with first, second, third and fourth recording heads, respectively, forming said first, second, third and fourth channels.

7. An analog data accumulating device for improving signal-to-noise ratio according to claim 6 wherein said analog data adder has a third input terminal, and said device further comprises a low-pass filter having an output terminal connected to said third input terminal and an input terminal connected to said third and fourth heads by way of said second means so as to subtract in said analog data adder low frequency components included in the reproduced synchronizing signal from the repeatedly added analog data.

8. An analog data accumulating device for improving signal-to-noise ratio according to claim 7, comprising a low-pass filter connected between said source and said first input terminal of said analog data adder, another low-pass filter connected between said output terminal of said analog adder and said first means, a shaping circuit connected between said analog data source and said second means for shaping the synchronizing signal to be fed to said source, and an inverter connected between said second input terminal and said first means for inverting the reproduced analog data to be fed to said second input terminal of said analog data adder.

9. An analog data accumulating device providing improved signal-to-noise ratio, according to claim 8 wherein said tape recorder includes means for rewinding said recording tape each time of switching of said switching means.